United States Patent [19]

Parks et al.

[11] Patent Number: 4,495,644
[45] Date of Patent: Jan. 22, 1985

[54] APPARATUS FOR SIGNATURE VERIFICATION

[75] Inventors: John R. Parks, West Byfleet; David R. Carr, Corfe Mullen; Peter F. Fox, Verwood, all of England

[73] Assignee: Quest Automation Public Limited Company, Hampshire, England

[21] Appl. No.: 371,886

[22] Filed: Apr. 26, 1982

[30] Foreign Application Priority Data

Apr. 27, 1981 [GB] United Kingdom ............... 8112949

[51] Int. Cl.³ .............................................. G06K 9/62
[52] U.S. Cl. .......................................... 382/3; 382/13
[58] Field of Search ...................................... 382/3, 13

[56] References Cited

U.S. PATENT DOCUMENTS 3,699,517 10/1972 Dyche ..................................... 382/3
3,818,443 6/1974 Radcliffe, Jr. ........................... 382/3
4,128,829 12/1978 Herbst et al. ........................... 382/3
4,156,911 5/1979 Crane et al. ............................ 382/3

Primary Examiner—Leo H. Boudreau
Attorney, Agent, or Firm—Pollock, Vande Sande and Priddy

[57] ABSTRACT

A method for real-time signature verification uses a transducer pad in which the pressure of a stylus causes contact to be made between two resistive films. Such a transducer is energized by current pulses to sample pairs of X and Y coordinates every 5 milliseconds. The analogue voltage outputs are converted to digital form and processed under the control of a microprocessor to determine numerical parameters each representing a significant feature of the signature pattern. A set of specimen signatures is collected and from these the mean values and standard deviations of several relevant parameters are calculated and committed to memory. The parameters for a working signature are compared with the respective stored mean values for the individual concerned. Each deviation from a stored mean value is compared with the corresponding stored standard deviation in a non-linear scoring circuit. The aggregate score derived from the comparison of several parameters is compared with a preset threshold level to decide whether or not a working signature is genuine.

7 Claims, 11 Drawing Figures

APPARATUS FOR SIGNATURE VERIFICATION

FIELD OF THE INVENTION

The present invention relates to the analysis and verification of predetermined written or drawn patterns and particularly to the verification of signatures as a means of protection against forgeries. The apparatus disclosed may serve the dual purpose of being used both as a means for entering handwritten data into a data processing system and also as a means of authorizing by signature, the input of such data to the system.

BACKGROUND TO THE INVENTION

It is customary to verify the authenticity of a written signature by comparing the pattern thereof with a previously registered pattern of the same signature, which may be held in the files of, for example, a bank or frequently nowadays already written on a credit card.

Hitherto, this task has been carried out manually but there is a need for a rapid and economic system for automatic signature verification. One of the difficulties inherent in such a system is to find a way of carrying out this task which is feasible on a large scale and applicable to digital data process techniques. Moreover if a credit card is stolen, it is not difficult for a thief skilled in such matters to learn how to copy the signature on the card accurately enough to satisfy a shop assistant or bank teller. Clearly there is a need for a more secure method of verifying a signature. Such a method could include monitoring the actual speed and rhythm employed by the authentic signatory and comparing these with stored coded records of the correct shape, speed and rhythm. A thief would not normally know, and would be very unlikely to be able to reproduce, the speed and rhythm used by the owner of the signature. Moreover, in the event that the legitimate owner of the card was using it at, for example, a street cash dispenser, and was accosted by a robber he may not under coercion sign his name with the same rhythm as he would use customarily under more relaxed conditions.

Quite a part from the above considerations, it is also common knowledge that the same person may sign his name on different occasions with patterns which are distinctly different in detail, and yet to the trained eye and in particular to the writer himself, such different signatures can be recognized as having been produced by the same hand. It is believed that the rhythm with which a signature is written is more important than the precise pattern produced, because it results from a learned sequence of nerve impulses delivered to the muscles of the hand at a rate too fast to have been controlled consciously with visual feedback.

BRIEF DESCRIPTION OF PRIOR ART

A technique and apparatus for applying these principles to the validation of signatures was disclosed by one of the present inventors and others, in U.K. Pat. No. 1480066, first filed in July 1973. In that specification, a hardware embodiment was described which enabled certain distinctive features in the rhythm and pattern of a signature to be identified, coded and compared. Further study of the problems involved and the use of more recently available technology, especially including microprocessor and software techniques, have led to various improvements in the method, which will be disclosed in the specification.

An electronic writing pad which gives coordinate readout of the position of a conventional writing instrument such as a pencil or pen in digital form was described in U.K. Pat. No. 1310683.

SUMMARY OF THE INVENTION

The invention provides apparatus for verifying the signature of an individual wishing to gain access to a facility comprising:

(i) a transducer responsive to the pressure of a ballpoint pen or similar instrument, when the individual writes on a sheet of paper that overlies the transducer, which transducer generates digital electronic signals in real time representing the position of the tip of the pen in terms of X and Y coordinates relative to a predetermined origin of coordinates;

(ii) means arranged to sample at a rapid rate the X and Y coordinates and therefrom to determine the changes from one sample of each coordinate to the next;

(iii) digital electronic processor means arranged to compute from these changes the X and Y components of velocity and of acceleration and their resultant vector, and further to identify significant features of the signature which may be represented by mathematical parameters;

(iv) memory means in which is stored (a) algorithms for identifying significant features of the signature, including upper and lower turning points of loops, points at which the pen is applied to or lifted from the paper, and lengths of segments of the signature measured as X or Y components or as resultant vectors of the path followed by the pen and (b) mean values and standard deviations or other indications of their spread, for numerical parameters representing a selection of these features obtained by analysis of several specimen signatures from each of a large number of individuals entitled, on verification of their signatures, to have access to the facility; and (v) decision means arranged to compare the parameters obtained from the working signature with the mean values and indications of spread for the corresponding parameters of the sample signatures of the same individual recalled from memory, wherein the limitations in the calculation of a realistic spread, or Standard Deviation, from a small sample of specimen signatures from one individual are overcome by the process of combining in the form of a weighted mean, the spread or Standard Division of a given parameter for the particular individual with the spread or Standard Deviation for the corresponding parameter as determined for a substantial sample of individuals.

Preferably, the apparatus is arranged to derive parameters from several successive signatures of an individual and to store averaged values and deviations therefrom for use in subsequent recognition of the signature of that individual.

The apparatus may also have the following additional features which are believed to be novel:

(a) the device is arranged to consider whether parameters from a specimen signature of an individual are consistent with previous specimens from that individual, to reject specimens which do not fall within specified consistency limits and to abort the collection of a series of specimen signatures from an individual after a predetermined number of such specimen signatures have been rejected;

(b) the original stored parameters appertaining to an individual may be updated by parameters derived from recent verified signatures of that individual;

(c) the spread or Standard deviation for a parameter derived from a set of specimen signatures provided by a single individual on a single occasion may be adjusted or "whitened" in accordance with the known standard deviation of that parameter under working conditions for the population as a whole;

(d) the difference between a stored parameter for a signature and a corresponding measured parameter for a signature to be verified is modified by a predetermined function to give an error score which, in a range of low differences is scored at a zero rate, in a range of intermediate differences is scored at a linear rate and for differences beyond the intermediate range is scored at a fixed high value;

(e) the scoring circuit has inputs by which the acceptable limits of total score may be adjusted in accordance with the measured variability of the signature of the individual, the value of the current transaction, the prevailing risk of attempted fraud and the deference which the system is required to present to a customer.

An important aspect of feature (b) is that the device can collect specimen signatures "on line" from real transactions and gradually build up a database of signature characteristics relating to the individuals using the system.

BRIEF DESCRIPTION OF THE DRAWINGS

Some embodiments of the present invention and its relationship to the prior art disclosed in the two British patents to which reference has been made above, will now be described with reference to the accompanying drawings, in in which.

DESCRIPTION OF THE PREFERRED EMBODIMENTS

Figure 1:
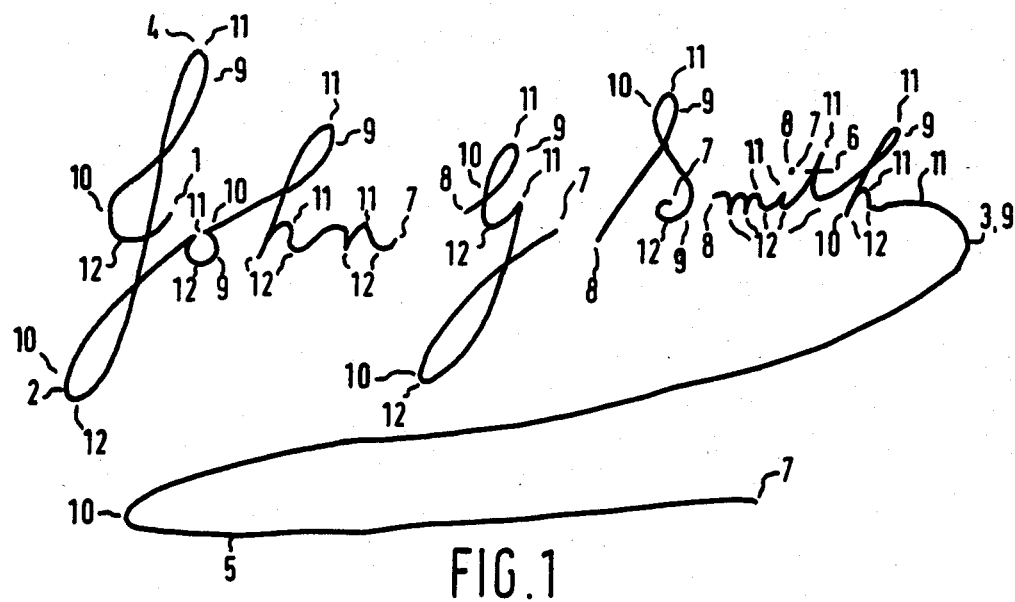
FIG. 1 is an illustration of a typical signature with several types of distinctive features identified.

FIG. 1 illustrates a typical signature, in which a number of distinctive features are identified. The first of these is the point (1) at which the pen or other writing instrument is first applied to the surface on which the signature is to be written. This point will usually be taken as the reference point both in terms of spatial and time measurements for other distinctive points in the signature, but alternatively any other distinctive point such as the left extremity (2) or the highest point (4) could be chosen as the reference point if this would give more reliable performance. The starting point (1) is not necessarily near the left side of the signature, one can readily visualize signatures in which this point may be near the middle of the signature or towards the right. Its position relative to the "center gravity" of the signature may in fact be an important parameter contributing to the distinctiveness of a signature.

The extreme right had extremity of the signature (3) and the lowest point (5) are two other easily recognized features of a signature, as are the other "turning points" (9, 10, 11, 12) to the right, left top and bottom of loops. There are several of these and in combination they can provide powerful verification parameters.

Other easily detected points which have a strong verification potential are the several points (7) at which the pen is lifted from the paper between separate segments of the total signature, and especially the last one (6) which can be recognised as representing the completion of the signature, both in spatial terms and in time.

Complementing the points of lift-off (7) are the points at which the pen is re-applied to the paper to begin the second and subsequent segments of the signature. Typically a signature is made up of several segments, which may be recognized as the traces extending between a point at which the pen is applied to the paper and the subsequent point at which it is lifted off. Often the first names or initials in a signature are separate segments from the surname, and there may be gaps between consecutive letter of one word, as between the "S" and the "m" of "Smith" in FIG. 1. The pen is usually lifted from the paper to place dots over the letters "i" or "j", to cross the"t"s or to apply accents. All of these segments, including dots, can have considerable significance, as also can the "hidden distances" between a point of lift-off (or "pen-up") and the next "pen-down.

The features described above are easily recognized by visual inspection of a completed signature, but there are others which can only be detected when the actual writing of the signature is monitored in real time.

Such features include velocities and accelerations of the pen, which may be measured in the horizontal (X)

direction, the vertical (Y) direction, or in the resultant direction of pen movement. It is also possible, when monitoring the writing of a signature in real time, to take note of the times at which distinctive features such as pen-ups, pen downs, and turning points are reached and to derive appropriate weighted and normalized parameters based on these measurements.

Other useful parameters can be derived from observing the sequences of turning points and their relative timings and spatial positions. Most of these features have been used before in signature verification apparatus, notably that described by Parks, Pobgee and Yardley in U.K. Pat. No. 1480066.

At a later stage in this specification some of these more complex parameters will be explained further, but it is appropriate at this point to describe in broad terms the apparatus based on the above patent, which has been further developed and improved by means of the techniques to be described subsequently, and which are believed to be novel when applied in this context.

Figure 2:
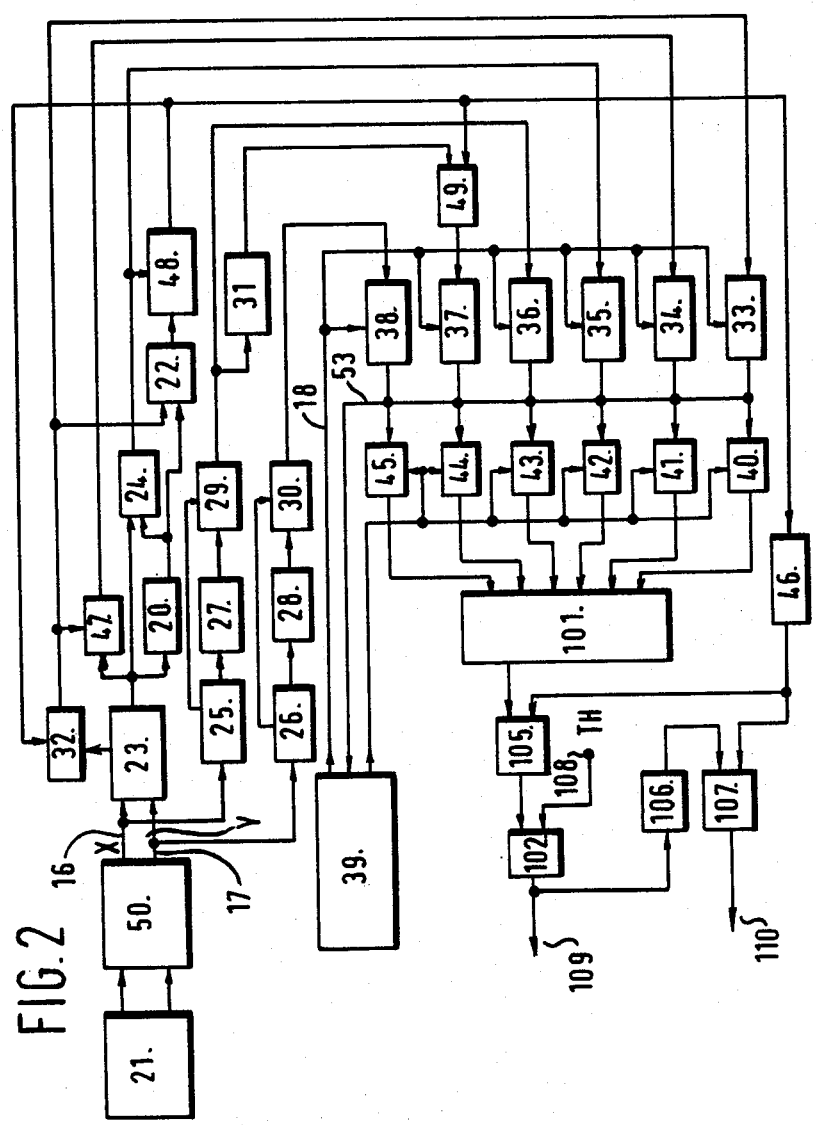
FIG. 2 is a block schematic diagram of a hardware configuration disclosed in U.K. Pat. No. 1480066 for the derivation of a set of six of the parameters in Table 1 from the analysis of some of the features illustrated in FIG. 1.

FIG. 2 shows in block schematic form, an apparatus first disclosed in U.K. Pat. No. 1480066 in which some of the parameters described above can be derived using digital techniques, from the output signals provided by a transducer pad (21) and Analogue/Digital converters (50) whose internal structure and circuitry are shown in more detail in FIGS. 3, 4 and 5.

The transducer pad, the operating principles of which have been fully described in U.K. Pat. No. 1310683, consists basically of an insulating base plate on which is deposited a rectangular uniformly resistive layer (51). Conductive strips (52) are applied along two opposing edges of the resistive layer and these strips are connected to a source either of alternating or pulsed direct current, so that a potential gradient is established across the layer from one conductive strip to the other.

A second resistive layer (54) of similar characteristics to the first is deposited on a flexible membrane which is stretched over the base plate in such a manner that the two resistive layers face each other but are held apart by spacers near the edges of the flexible layer, and may also be further isolated from each other by small islands of insulating material deposited over the resistive layer as described in U.K. Pat. No. 1310683. The two layers are therefore normally isolated from each-other unless pressure is applied at a discrete point (55) on the surface of the flexible layer as for example by the application of the tip of an instrument such as a pencil or a ball point pen. When such a writing instrument is applied, the second resistive layer (54), if not connected to any other source of electrical potential, will take up the potential of the point where it makes contact with the first layer. A voltage sensing circuit (56) connected to the conductive strips (57) of the second layer will therefore provide an analogue indication of one coordinate of the position of the pen tip. The conductive strips (57) connected to the second layer (54) are located at the edges of the layer perpendicular to the edges of the first layer (51) along which its conductive strips are connected. If therefore the electrical connections to the two layers are interchanged, with the second layer carrying current while the first layer is connected to a second voltage sensing circuit (58), the voltage sensed in the second circuit (58) will give an analogue indication of the second cartesian coordinate of the position of the pen tip.

Figure 5:
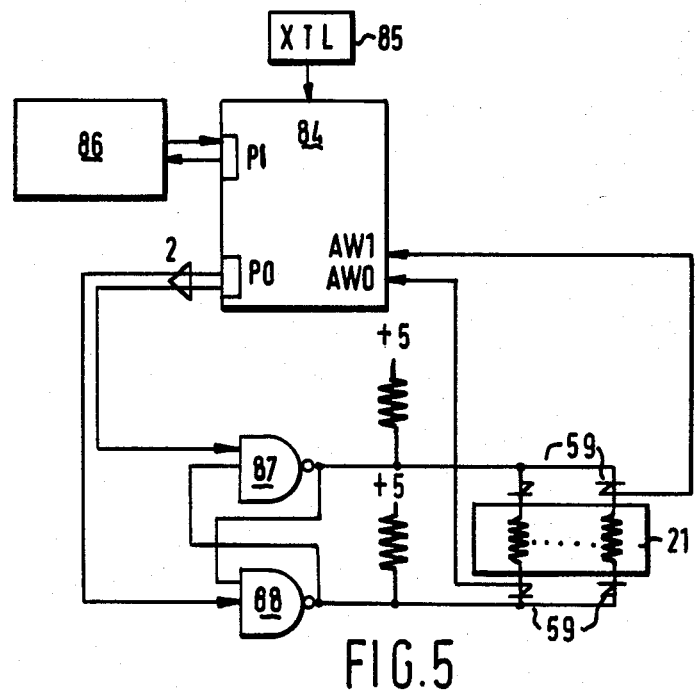
FIG. 5 shows how a currently available microprocessor chip may be used in conjunction with the transducer pad of U.K. Pat. No. 1310683 to produce results equivalent to but surpassing in efficiency those provided by the circuit of FIG. 2
Figure 3A:
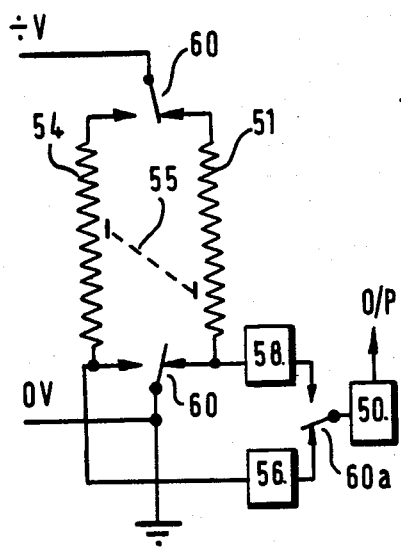
FIG. 3 shows two versions (3a and 3b) of a circuit disclosed in U.K. Pat. No. 1310683 whereby alternate analogue voltage signals may be derived on two signal lines to represent the x and y coordinates of the position of a pen on a transducer pad.
Figure 3B:
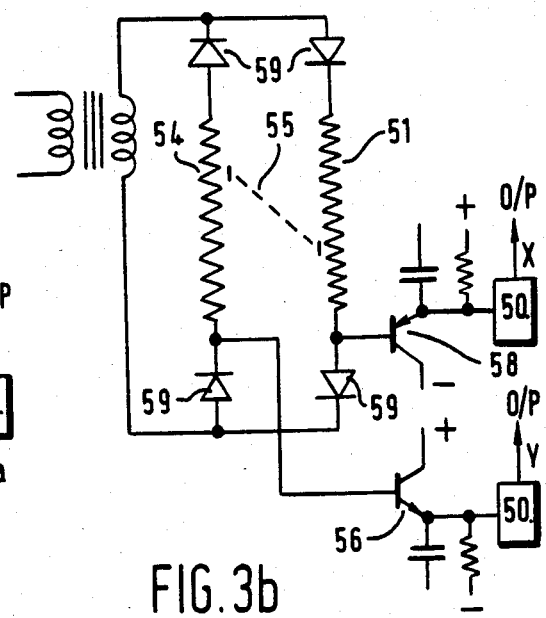
Figure 4:
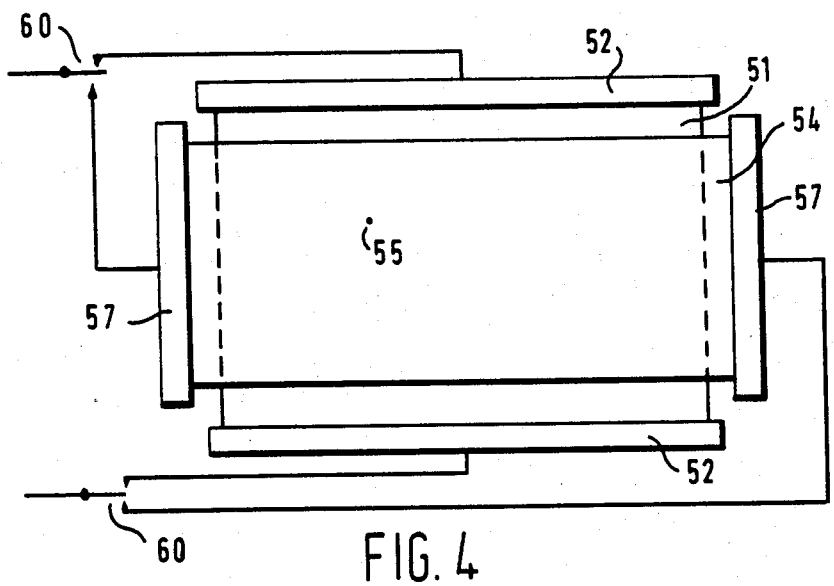
FIG. 4 shows in simplified form the construction of a transducer pad forming part of the circuits in FIG. 3 and first disclosed in U.K. Pat. No. 1310683

Instead of switching the source of current between the two resistive layers (51 and 54) by means of switches (60) as depicted in FIG. 3a, the same effect can be achieved by connecting diodes (59) in series with the two resistive layers as shown in FIG. 3b and energizing them with the alternate half-cycles of an alternating current. A third method of energizing the transducer pad is preferred for the present embodiment, wherein two alternating sequences of digital pulses are applied, one to layer (51) and the other to layer (54). FIG. 5 shows such an arrangement in which the two interlaced trains of pulses are derived from clock-pulse outputs of a proprietory microprocessor chip.

Whichever method is used to energize the transducer pad, the effect is to produce at the outputs from the voltage sensing circuits (56,58) a series of analogue voltages representing alternately, successive X and Y coordinates.

If the drive currents applied to the transducer pad are derived from alternate half-cycles of the mains supply, the sampling rate for each of the two sets of output signals will be 50 (or 60) per second, giving a measurement of pen position every 20 milliseconds. For real-time monitoring of the writing of a signature, this rate is rather low to give adequate resolution of detail. Electronically generated pulses allow a faster rate of sampling to be used. Two hundred samples per second has been found convenient, drive pulses being applied to the transducer pad every 2.5 milliseconds to the X and Y inputs alternately.

The analogue voltage outputs from the sensing circuits (56, 58) may each be fed to separate Analogue/Digital convertors (50) as shown in FIG. 3b, or they could be switched in synchronism with switches (60) by a further switch (60a) to share a common analogue/digital converter (50) as shown in FIG. 3a.

When operated in a higher speed digitally pulsed mode, it is most convenient to use a microprocessor chip such as the Intel type 8022, which is provided with a pair of analogue/digital converters on the chip. This arrangement is also indicated in FIG. 5. Additional details shown in FIG. 5 include a crystal oscillator (85) chosen to define the clock frequencies used by the microprocessor, for its internal operations, and also the clock rates output from the microprocessor to drive the transducer pad (21).

The power output from the microprocessor will not be adequate to produce the necessary current drive to the transducer pad, therefore a pair of NAND gates (87,88) are connected as an R-S flipflop circuit to provide the necessary current drive to the pad and also to ensure that only one resistive layer of the pad can be energized at a time. Memory module (86) contains the operating instructions for the microprocessor, the mathematical algorithms used in the analysis of the signals derived from the transducer pad and the data collected from the pad, on which the algorithms operate to reach the required decisions as to the validity of a signature written on the pad (21).

Reverting to FIG. 2, the general principles of operation of the system will be described in terms of a digital hardware embodiment, which was first presented in U.K. Pat. No. 1480066.

The digital data derived from the transducer pad (21) by Analogue/Digital converters (50) are applied on X and Y input lines (16, 17) to three input modules (23, 25, 26).

When no contact is being made on the transducer pad (21) by the pen, the sensor circuits (56, 58) have no voltage injected into them and therefore they respond as if the coordinates of the pen point were both zero.

This condition is sensed by the Contact Detector (23). If either or both of the coordinate inputs (16, 17) represent zero, the output of contact detector (23) sets bistable (24) accordingly. When the pen is in contact with the paper, therefore the output from bistable (24) enables clock pulses to be accumulated by counter (35) for as long as bistable (24) remains set.

Registers (25 and 26) store the latest digital inputs on lines (16, 17), which represent the current position of the pen, until the next set of inputs is received. When a new set of coordinate inputs is received, the old set is transfered from registers (25) and (26) to registers (27) and (28) respectively. A pair of digital subtractors (29, 30) derive the differences between the current and the preceding values of both the X and the Y coordinates, and thus produce digital numbers proportional to the velocity of the pen as resolved into X and Y components. A comparator circuit (31) compares the magnitude of each such difference in the X components with subsequent ones and retains the higher value.

This comparison continues throughout the sampling of the complete signature and the final number held in comparator (31) therefore represents the maximum X increment, and therefore the maximum velocity since all increments of distance are measured over the same basic time interval. Provision may also be made to record the time, as expressed as a count of time intervals from the first instant of the pen making contact with the paper on the pad, when the maximum velocity was detected. Although not shown in FIG. 2, obviously a similar parameter may be defined in respect of the maximum velocity in the Y direction, and its timing, and moreover separate measurements may be made for both positive and negative values of these velocities.

The first time contact of the pen on the pad is sensed, contact detector (23) outputs a signal to a clock generator (32) and the output from this clock continues until stopped by a final timeout after the end of the signature has been identified. Counts from this clock gated with other signals for example at gates (47) and (22) enable the timing of particular events to be recorded in counters such as those shown (33–38). Counter (33) in particular records the running count of clock pulses until the clock is stopped, and could be sampled at any time by other circuits to read the times at which significant events occur.

Clock pulses from clock module (32) are gated with the output of contact detector (23) in gate (47) to produce a measure of Time in Contact (TIC) for the pen on the pad. The output from gate (47) is passed to counter (34) which keeps a running record of "TIC".

Since the output of contact detector (23) monitors contact, the output of invertor 20 monitors lack of contact, and its output is gated with the output of clock (32) in the same way by gate (22) to produce a Time Out of Contact signal (TOC). This signal may be passed to a counter equivalent to the "TIC" counter (34) to record a cumulative count of all "TOC" signals. Normally the gaps between segments of a signature will be short, less than say 0.5 second, and when an out of contact signal exceeding this duration is sensed, it may be recognized as the end of the signature. This recognition may be provided for by connecting the output of gate (22) to a counter (48) set such that if it reaches a predetermined count before being reset by a signal output from bistable (24) indicating that contact has been restored, it will output to gate (49) and delay circuit (46) a signal indicating the completion of the signature.

The six counters (33–38) have thus been supplied with numerical data representing the following parameters for the signature under examination:
in counter 33: Total elapsed time from start.
in counter 34: Time in Contact.
in counter 35: Number of segments in signature.
in counter 36: Sum of increments in X (length)
in counter 37: Maximum increment (velocity) in X
in counter 38: Sum of increments in Y (height)

In practice, more than this number of parameters will be monitored, and therefore a larger number of counters will be employed, but the principles will remain the same.

The counts held in the counter modules (33–38) for a signature to be verified (hereafter referred to as a working signature) are compared with reference parameters stored in a data base (39) and a learning process is needed in which these parameters are defined and loaded into the data base.

The reference parameters used in the system consist of mean values of the counts expected in each of the counters (33–38) and a measure of the spreads in these counts encountered when analyzing a set of specimen signatures. The spreads may conveniently, but not exclusively, be stored in the form of Standard Deviations calculated over the set of specimen signatures. The mean values and spreads are typically derived fom a set of six specimen signatures provided by the individual whose working signatures are to be verified. Certain enhancements may be introduced to the basic Standard Deviations as measured. These will be explained later. The steps involved in analyzing these specimen signatures and deriving the means and standard deviations are outlined in the flow chart of FIG. 6.

To mimimize the problems which could arise if two different individuals had signatures which were sufficiently similar to lie within the tolerances set for the recognition of either one of them, or of a random scribble on the pad imitating one of a large number of signatures in the data base of a system, a useful security measure is to allocate each individual a code number which is entered into the system manually or by a card reader, capable of reading a code carried on an authority card (credit card or the like) by the individual.

This code number accesses the address in the data base at which the parameters for the signature of that individual are stored or will be stored. During ensuing verification operations, the claimed identity of the individual as represented by this code number is used to select from the data base only those parameters appropriate to that unique individual for comparison with those derived from his working signature.

Figure 6:
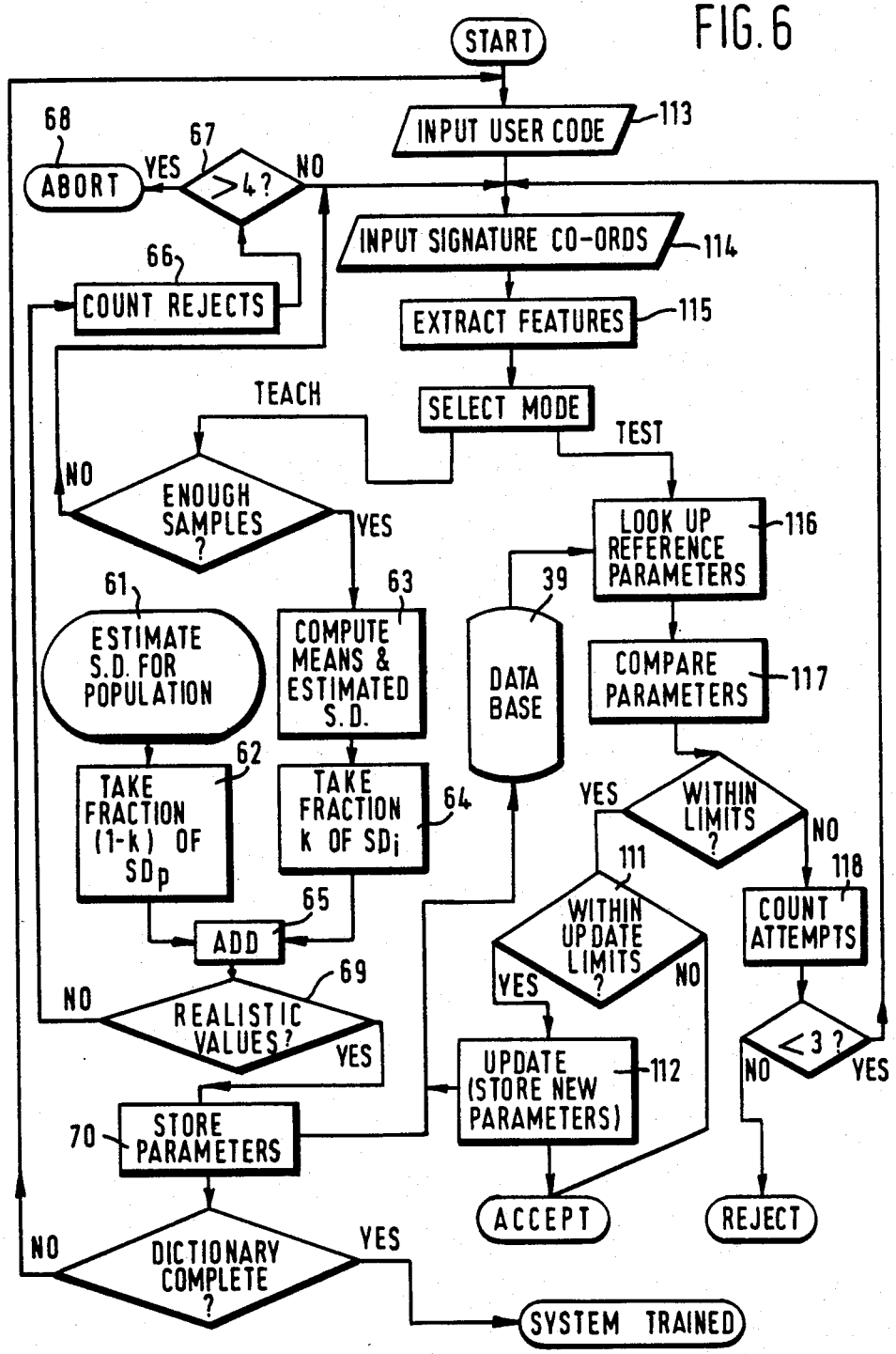
FIG. 6 is a flow chart summarizing the operational steps followed when deriving reference parameters from a set of specimen signatures and for using these reference parameters in the verification of a working signature. This is based on a similar flow chart presented in U.K. Pat. No. 1480066, but includes some additional innovative steps made possible by the use of the microprocessor.

In either the teaching or the verification sequences, the first step(113)shown in FIG. 6 is the input of this User code number, which causes the relevant parameters to be called up from the data base and power to be applied to the transducer pad (21). By means of a visual dispay screen associated with the system, the individual is asked to write a specimen signature on a sheet of paper fitted to the transducer pad (21). As he writes, the coordinates of successive points in his signature are sampled at intervals typically of 5 milliseconds by the system depicted in FIG. 2 and the significant parameters accumulated in counters (33–38) are signalled over line (53) for storage in a working area of memory within data base(39). After the first set of parameters have been collected and analyzed, the system asks the individual providing the specimen signatures to sign again. The process is repeated a second and subsequent times until a sufficient number have been provided to enable mean values and spreads to be computed for each of the significant parameters. The additional data obtained from the repeated signatures are stored alongside those for the first signature, and are then used to compute the means and standard deviations.

Since a small sample of about six specimen signatures may not always give a realistic spread of values when they are all taken under identical conditions, it has been found useful to apply randomizing factors to the standard deviations. This is done by adding to the standard deviation for each parameter computed for a given individual, a predetermined proportion of the standard deviation for that same parameter as found to apply generally for a range of conditions for a significant sample of the population at large. Various prearranged weightings may be used. One preferred manner of combining the standard deviations of the individual and that of the population at large is simply to take the mean of the two deviations.

$$SD_{corrected} = \frac{SD_i + SD_p}{2}$$

If the resulting parameters derived as above are found to conform to what experience shows to be realistic limits, the resulting means values and standard deviations for each parameter are stored in the main data base. If they are not considered realistic, the system may call for further specimen signatures to be included in the analysis and may discard any specimens which are widely inconsistent with the majority. If the additional signatures called for do not produce realistic results after the provision of a designated number of additional specimens, the whole attempt to obtain a consistent set may be aborted and a new set collected on a subsequent occasion. When the system is used in the Verification mode to check the parameters of a working signature, input of the signer's code number causes his particular set of mean parameters to be loaded in the form of numerical counts over line(18)of FIG. 2 from the Data base to the counters (33-38) and thereafter, the numbers generated as described above, by modules (24, 29, 30, 31, 32 and 47) are counted down from the reference values set into the respective counters.

If the working parameters matched exactly those held in the data base, at the end of the signature, all the counters would have counted down exactly to zero, but of course no two signatures even by the same hand are exactly alike and therefore it is likely that small residual numbers will remain in each counter; the wider these residual counts deviate from zero, the wider the deviation of the respective parameters from the mean values stored in the data base.

Some parameters are more significant than others and some will have larger standard deviations than others.

Factors which may be standard deviations or a simple binary fraction of these are input from the data base to multiplier modules (40-45) where the residual counts in counters (33-38) are divided by the designated factors to produce a set of weighted scores. These weighted scores are fed into addition module (101) whose output, representing the aggregate score for the signature being verified, is passed to AND gate (105). This signal remains isolated by gate (105) until the output of counter 48 has reached a level representing a time interval longer than could reasonably be expected to occur between signature segments.

Its output to AND-gate (49) and through a further short delay (46) to AND-gate (105) defines the end of the signature. Before delay (46) has had time to take effect, the signal on AND-gate (49) causes the contents of counter (31) to be transferred to counter (37) whereupon the change in its count updates the total count output from adder (101) to AND-gate (105). At the expiry of the delay (46) the AND-gates (105) and (107) are enabled, so permitting the output of adder (101) to be passed to comparator (102) where it is compared with a preset threshold level (108). If this threshold is not exceeded by the aggregate count output from adder (101), an acceptance signal is output at terminal (109). If the count output from adder (101) exceeds the threshold level (108) the inverter (106) holds the input of AND-gate (107) high, with the result that a reject signal is output at terminal (110).

As described above, the inputs to the addition module (101) consist of the counts accumulated in the feature counters (33-38) each weighted by a factor normalizing them to the standard deviation derived for the specimen signatures of the individual and stored in the data base.

An alternative option first suggested in U.K. Pat. No. 1480066 was to square the weighted differences extracted from these counters before adding them in addition module (101).

Figure 8:
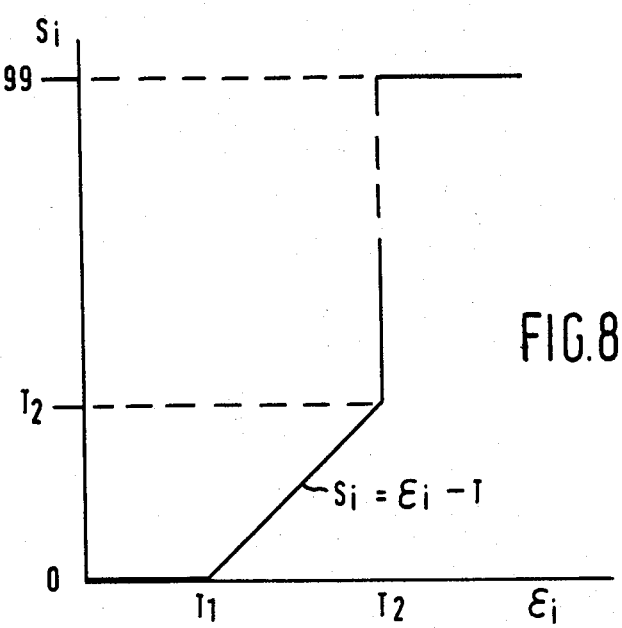
FIG. 8 shows a non-linear weighting curve which has been adopted in the system to allow parameters of low discriminatory value to be ignored and those of high significance to be given perponderant weighting in comparison with the normal range of weightings given to typical parameters.

A further improvement has been developed, which enables the advantages of non-linear scoring to be achieved without the complexity of introducing squaring circuits. The nature of this improvement is illustrated in FIG. 8.

Let the mean value of a given parameter "j" for an individual "i" be $\overline{x}_{ij}$ and let the corresponding value of this parameter as derived from a working signature to be verified be $x_{ij}$.

The scalar difference between the two values is:

$$|\overline{x}_{ij} - x_{ij}|$$

This may be expressed as a multiple of the Standard deviation $\sigma_{ij}$ by dividing:

$$\frac{|\overline{x}_{ij} - x_{ij}|}{\delta_{ij}}$$

This multiple in turn may be given a binary weighting of N=1, 2, 4 or 8 and then expressed as a scaling factor $\epsilon_{ij}$.

Figure 9:
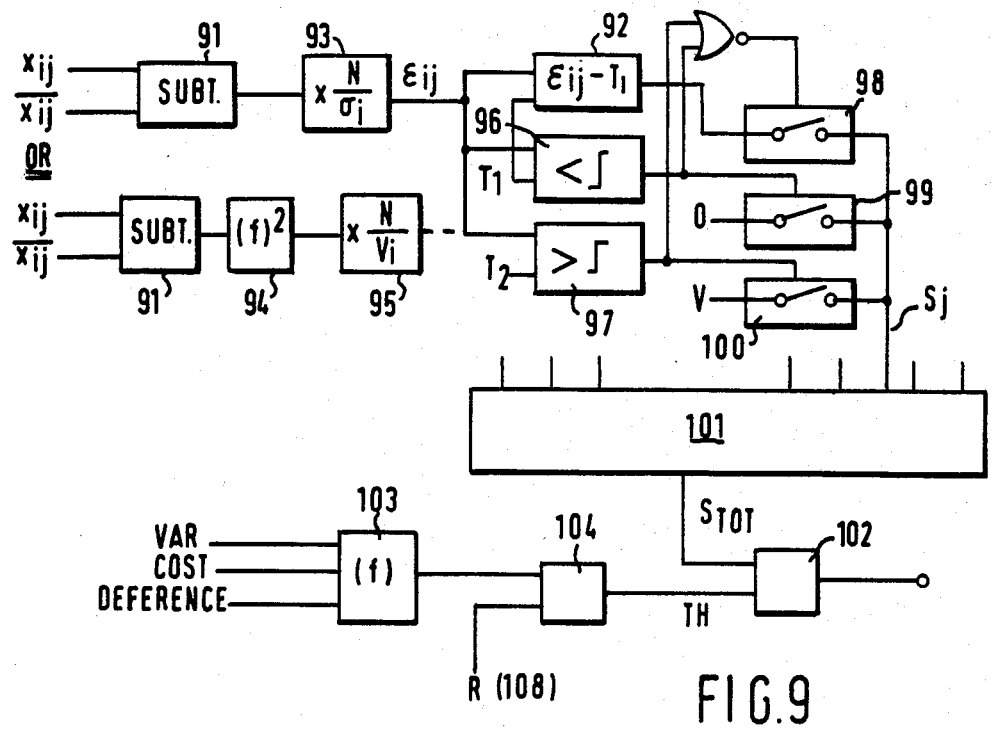
FIG. 9 is a block schematic diagram of a hardware module capable of implementing the non-linear weighting curve shown in FIG. 8.

FIG. 9 shows data $\overline{x}_{ij}$ and $x_{ij}$ applied to the inputs of a digital subtractor (91) whose output $(\overline{x}_{ij} - x_{ij})$ with its sign ignored is applied to a multiplier (93) where it is multiplied by $N/\sigma_{ij}$ before application to two comparators (96,97) having thresholds $T_1$ and $T_2$ respectively. The outputs of these comparators are arranged such that if the threshold $T_2$ is exceeded, a very high score (for example 99) is set by means of switch (99) on the line supplying input "j" to the addition module (101). If neither threshold $T$ nor $T_2$ is exceeded, a score of zero is applied by switch (100) to the input line "j" of the addition module (101), but if threshold $T_1$ is exceeded and not threshold $T_2$, switch (98) passes a score $S_{ij} = \epsilon_{ij} - T_1$ to module (101).

By this means it is possible to arrange that parameters falling below threshold $T_1$ do not contribute to any rejection decision, those falling between $T_1$ and $T_2$ are weighted linearly with ε, while those falling above the threshold T₂ cause the signature to be summarily rejected. Once the total score S_tot appertaining to all the separate parameters derived from a signature has been accumulated by addition module (101) it is passed to comparator (102) where an output signal binary ONE is generated if S_tot is less than threshold TH, or a binary ZERO is generated if S_tot exceeds this threshold TH.

Threshold TH itself may be set to different levels at the discretion of the system operator.

The value of this threshold (TH) will have a fixed upper limit, or default level R, above which any input signal from the addition module (101) would result in summary rejection of the proffered signature. However, this upper limit would normally be reduced to a more stringent level depending on the circumstances under which the system was being operated. Considerations which might dictate the imposition of a lower threshold include:

The variability of the signature of the individual concerned compared to that of the population at large.

The cash value of the transaction being authorized, for example in the case of a credit card transaction, the cost of the merchandise being bought.

The reliability of the holder of a credit card as indicated for example by his credit limit, or the esteem in which the customer of a bank or retail business might be held.

The previous experience of fraudulent activities in the locality where the terminal is operated.

The variability of a signature is capable of quantitative evaluation, as will now be demonstrated.

There are a number of ways in which the Variability of a set of specimen signatures can be defined mathematically. The simplest of these, based on the standard deviations of n parameters for individual "i" in a population of "p" individuals is given by:

$$\text{VARIABILITY} = \sum_n \frac{SD_{ij}}{SD_{pj}}$$

where "j" refers to one of the n parameters whose overall effect is under consideration.

Alternatively, it can be convenient to work with Variances instead of Standard Deviations, where $$\text{Variance} = (\text{Standard Deviation})^2$$

$$\text{Then, VARIABILITY} = \sum_n \frac{\text{Variance}_{ij}}{\text{Variance}_{pj}}$$

A third definition has been found useful, in which the modified value of Standard Deviation is used after "whitening", by the addition to the standard deviation of the parameters of the present signature, of a correction based on the standard devication for the population at large for the corresponding parameter. Then:

$$\text{VARIABILITY} = \sum_n \frac{k \cdot SD_{ij} + (1-k) \cdot SD_{pj}}{SD_{pj}}$$

$$= \sum_n \frac{\text{"Whitened"} SD_{ij}}{SD_{pj}}$$

and if k is taken as 0.5, as is often the case, this latter definition simplifies to:

$$\text{VARIABILITY} = \sum_n \frac{SD_{ij} + SD_{pj}}{2 SD_{pj}}$$

Another important feature illustrated in the flow chart of FIG. 6 is the facility to update the parameters stored in the data base using new information derived from the actual working signatures presented for verification.

It will be seen from FIG. 6 that after the parameters derived from the working signature have been compared (117) with those called up from the data base (39) the first check carried out is to ensure that the score derived from the comparison is within limits. If it is, a further check may be applied with tighter limits (111). If this test shows the new data to be within the standard deviations of the reference parameters, it may well be that the new parameters will provide a better model of the true working signatures for the individual than has been provided by the original set of specimen signatures.

There are various reasons why this should be the case. The specimen signatures may have been taken under conditions different from those of the working signatures. For example, they may have been taken in a bank manager's office rather than at the normal cashier's position. They may have been taken when the writer was more relaxed than he would be on a normal active day. The form of his signature and the steadiness of his hand will probably vary with his health and advancing age.

A convenient method of providing for the updating of stored parameters is to recalculate the means values of each parameter and its standard deviation by calculating a weighted mean between the new parameters and the old, with the weighting in favor of the old stored parameters being dependent on the number of previous samples on which they were based.

Once the total number of signatures taken exceeds ten, it is no longer necessary to keep count of how many have been taken. It is more convenient simply to apply a weight of 90% to the stored parameters and 10% to the new ones in order to modify the stored parameters by a small amount each time a signature is verified and accepted for use in a data-base update. By this means, a single inconsistent result would not be allowed to update the stored parameters and even one which differed only slightly from the stored data would only be allowed to influence that stored data to a limited extent. If, however, a minor change became a regular feature of a signature, the cumulative effect of this change over a series of about ten or twenty signatures would be to adapt the stored record progressively and give progressively greater weight to the new feature at the expense of any feature which it superseded.

In view of this ability to collect data from working signatures, the special procedures often involved in collecting specimen signatures can be avoided. If, during the early stages of introducing a system in for example an "American Express" context, the users sign in the usual way for the credit facility being employed, but as they do so, the parameters of their signatures are recorded and passed to a central processor, to be stored until a sufficient number of other signatures from each individual have been analyzed, a valid set of mean parameters and standard deviations could be built up to enable verification to be applied to subsequent working signatures.

To date only a few parameters have been mentioned, which might be used as the significant ones on which to base a signature verification technique. It is believed that an optimum number of parameters to employ in a given system is between ten and twenty, although a much higher number than this can be considered, and it might even be advantageous for a system to be operated at different times with different sets of parameters in order confuse ingenious delinquents who might be tempted to try and "beat the system".

Table 1 lists a considerable number of parameters which can be derived without too much difficulty from the "first order primitives" monitored by the circuit depicted in FIG. 2. In the right hand column of the table, the manner in which the parameter may be derived from less complex parameters is indicated. The numbers in brackets refer to the less complex parameters involved.

The list given in Table 1 is not exhaustive, a little study would suggest other parameters which might be used, but this list includes most of the parameters most likely to be employed in a practical system.

Figure 10:
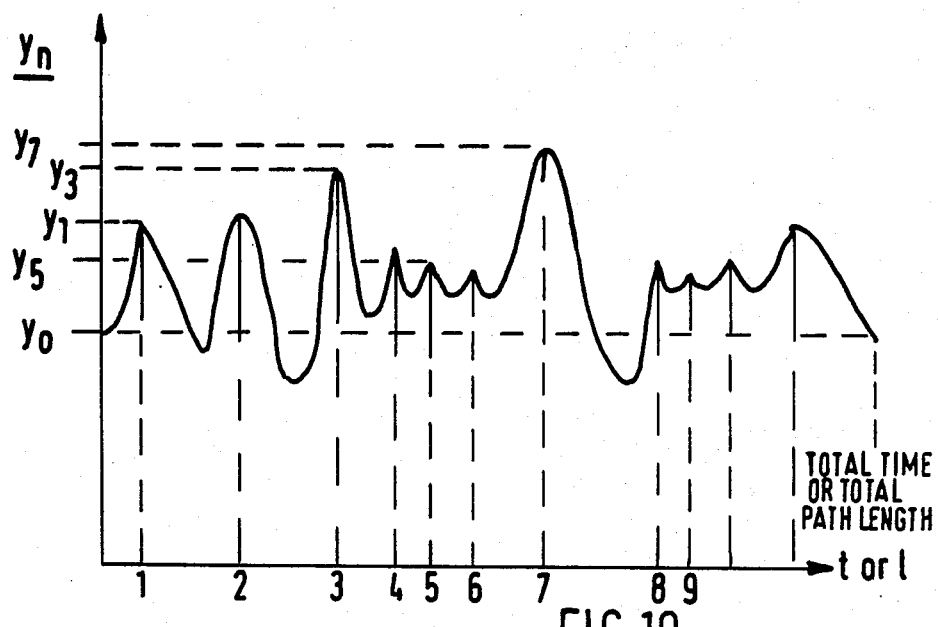
FIG. 10 illustrates graphically a weighting and normallising method used in the derivation of some of the more complex parameters used by the system.

The evaluation of the weighted and normalized parameters (88) and (89) in Table 1 may be better understood by reference to FIG. 10 which illustrates in graphical form how these parameters are to be interpreted.

TABLE 1  FEATURES FOUND USEFUL IN THE ANALYSIS OF A SIGNATURE

| | | |
|---|---|---|
| A | FIRST ORDER PRIMITIVES | How derived: |
| 1 | Pen out of contact with paper | $x$ and/or $y = 0$ |
| 2 | Pen in contact with paper | $x \neq 0$ and $y \neq 0$ |
| 3 | Current position of pen | $x_n$ and $y_n$ |
| 4 | Previous position of pen | $x_{(n-1)}$ and $y_{(n-1)}$ |
| B | SIMPLE DERIVED PARAMETERS | |
| 5 | First "Pen Down" | change from condition (1) to (2) |
| 6 | Subsequent "Pen Downs" | " " " " " |
| 7 | Last "Pen up" | " " " (2) to (1) |
| 8 | Previous "Pen ups" | " " " " " |
| 9 | Completion of signature | As (7) confirmed by timeout. |
| 10 | Length of signature | "x" difference between (5) & (7) |
| 11 | Duration of signature | count of pulses " " " |
| 12 | Number of segments | number of "pen downs" |
| 13/14 | x and y coordinates of each "pen down" and "pen up" | |
| 15 | "Hidden distances" in x | differences (14)-(13) in pairs |
| 16 | Total hidden distance in x | aggregate of all as (15) |
| 17 | Left extremity of signature | lowest value of x other than 0 |
| 18 | Right extremity of signature | highest value of x |
| 19 | Overall length of signature | difference (18)-(17) |
| 20 | Highest point of signature | highest value of y |
| 21 | Lowest point of signature | lowest value of y other than 0 |
| 22 | Overall height of signature | difference (21)-(20) |
| 23 | x-increment (= x velocity) | $x_n - x_{(n-1)}$ |
| 24 | y-increment (=y velocity) | $y_n - y_{(n-1)}$ |
| 25 | Resultant increment (velocity) | $\{(x_n - x_{n-1})^2 + (y_n - y_{n-1})^2\}^{\frac{1}{2}}$ |
| 26 | Positive turning points in y | $y_n - y_{n-1}$ changes from -ve to + |
| 27 | Negative turning points in y | $y_n - y_{n-1}$ changes from + to -ve. |
| 28 | Positive turning points in x | $x_n - x_{n-1}$ changes from -ve to + |
| 29 | Negative turning points in x | $x_n - x_{n-1}$ changes from + to -ve. |
| 30 | Maximum rightward component of vel. | Max value of (23) |
| 31 | Maximum leftward " " " | most -ve. value of (23) |
| 32 | Maximum upward component of vel. | Max +ve. value of (24) |
| 33 | Maximum downward " " " | most -ve. value of (24) |
| 34 | Average rightward " " " | mean of +ve values of (23) |
| 35 | Average leftward " " " | mean of -ve values of (23) |
| 36 | Average upward " " " | mean of +ve values of (24) |
| 37 | Average downward " " " | mean of -ve values of (24). |
| 38 | Number of positive T.P. in y | count of events (26) |
| 39 | Number of negative T.P. in y | " " " (27) |
| 40 | Number of positive T.P. in x | " " " (28) |
| 41 | Number of negative T.P. in x | " " " (29) |
| 42 | Total number of turning points | Sum of (38),(39),(40)&(41) |
| 43 | Hidden distances in y | Similar to (15) |
| 44 | Resultant hidden distances | Resultants of (15) & (43) |
| 45 | Average hidden distances | Mean of all as (15) or (44) |
| 46 | Length of segments | differences (13)-(14) |
| 47 | Average segment length | Mean of all as (46) |
| 48 | Hesitations | points where (23)&(24)=0 |
| 49 | Mean duration of hesitations | |

| | | |
|---|---|---|
| 50 | Number of hesitations | |
| 51 | Maximum and total durations of hesitations | |
| 52 | Total y travel | "y" difference from (5) to (7) |
| 53 | Maximum resultant velocity | Maximum value of (25) |
| 54 | Total path length followed by pen | Sum of all items (25) |
| 55 | Aspect Ratio | Item (22) divided by (19) |
| 56 | Slant Factor | Slope of line from (17)-(18) |
| 57 | Path length in each segment | As (54) for each segment |
| 58 | Segment length/Total length | (46) divided by (10) |
| 59 | Segment path length /Total p.l. | (57) divided by (54) |
| 60 | x-component of total path length | Scalar sum of all (23) |
| 61 | y-component " " " " | Scalar sum of all (24) |
| 62 | x coordinate of centre of gravity | x coord for 50% of (54) |
| 63 | y coordinate of centre of gravity | y coord for 50% of (54) |
| 64 | Integrated Horizontal distance for groups of features | $\sum_{nos} K.(x_n - x_0)$ |
| 65 | Integrated vertical distance for groups of features | similarly for y |

C  TIME-DEPENDENT  PARAMETERS

| | | |
|---|---|---|
| 70 | Total time of "pen downs"  ( TIC ) | count of clock pulses i.c. |
| 71 | Total time of "pen ups"  ( TOC ) | count of clock pulses o.c. |
| 72 | Fraction of time in contact | (70) divided by (11) |
| 73 | Fraction of time out of contact | (71) divided by (11) |
| 74 | Time to each "pen up" & "Pen down" | clock counts from (5) to (6/8) |
| 75 | Time to each turning point | "     "     " (5) to (26-29) |
| 76 | Time taken to write each segment | "     "     " (6) to (8) |
| 77 | Normalised time for each segment | (76) divided by (11) |
| 78 | Average time per segment | (11) divided by (12) |
| 79 | Individual times out of contact | clock counts from (8) to (6) |
| 80 | Average times out of contact | (71) divided by (12)-1 |
| 81 | Time taken to reach centre of gravity | clock count to (62) |
| 82 | Time taken to reach mid length | clock count to $\frac{(5)+(7)}{2}$ |
| 83 | x distance covered in half time | sum of (23) to 50% of (11) |
| 84 | Path distance "     "     "     " | sum of (25) to 50% of (11) |
| 85 | Sequences of turning points | |
| 86 | Average horizontal velocity | (10) divided by (11) |
| 87 | Average vertical velocity | (52) divided by (11) |
| 88 | Average velocity in pen path | (54) divided by (11) |
| 89 | Weighted & normalised path length to events of each type | As (64),(65) or (66) divided by (54) |
| 90 | Weighted & normalised timing to events of each type | As (64),(65) or (66) divided by (11) |
| 91 | Horizontal Symmetry Index | $\sum_{nos} \overline{x_n} - x_0$ for all as (2) |
| 92 | Vertical Symmetry Index | $\sum_{nos} \overline{y_n} - y_0$ for all as (2) |
| 93 | Spatial Complexity Factor | (54) divided by (22)+(19) |

Figure 7:
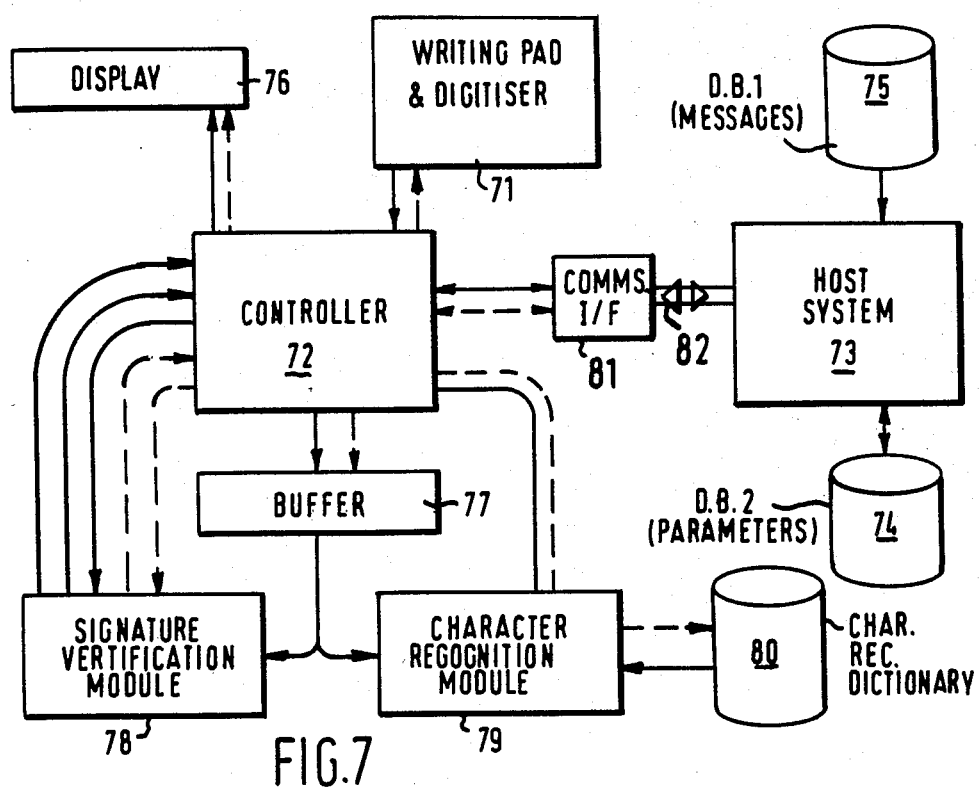
FIG. 7 shows in block schematic form, a system configuration in which a signature verification module in accordance with the present invention may be combined with a character recognition module using the same transducer pad and the combined terminal may be linked to a host computer system.

It has been found convenient to assemble a system to perform both the Signature Verification task and also to provide the capability of recognizing alphanumerics written by hand on the same transducer pad. A typical and preferred arrangement of such a dual-function system may be assembled in modular form as illustrated in FIG. 7.

The transducer pad and its associated Analogue/Digital converters (71) supply input coordinates to the Controller (72) which may take the form of a second microprocessor.

The controller may have access over a data link to a host system (73) which may be located remotely, or adjacent to the operating position. This host processor (73) has access to appropriate random access backing stores such as magnetic discs (74, 75) on which are recorded the predetermined recognition parameters for a large population of registered signatures (data base (39) of FIG. 2) and also a repertoire of appropriate responses to be displayed when required on the Visual Display module (76) fitted in the same housing as the transducer pad.

The controller (72) arranges for the sequence of coordinate values (the first order primitives of Tables 1) to be entered into a circulating buffer (77) in order to spread the work load between points of high analytical activity and adjacent points where this activity is less concentrated.

The module concerned with Signature Verification (78) and that concerned with Character Recognition (79) can each draw their incoming data stream from the circulating buffer (77) after a short delay.

In most applications where both signature verification and character recognition are required, it is normal practice for a designated area on the document concerned to be used for the application of the signature. It can readily be arranged that when contact is sensed in the Signature area of the document, a signal from the controller, by-passing the buffer (77) will select the data path to the Signature Verification module (78) and when contact is sensed in the areas of the document allocated for alphanumeric information, the controller will select the data path to the Character Recognition module (79).

When operating in the Character Recognition mode, the Character recognition module (79) compares the pattern of coordinates received from the buffer (77) with those stored in its own Character Description Dictionary (80) and on recognizing the pattern received returns appropriately coded digital signals in for example, ASCII code to the local visual display module (76) and also if required, under the control of controller (72) over the communications channel (82) to the host system (73).

When operating in the Signature Verification mode, the controller (72) sends the coordinate data stream from the buffer (77) to Signature Verification module (78) together with the stored parameters appertaining to the claimed identity of the individual providing the signature, which may have been received from the host system (73) over the communication link (82), or for signatures used frequently at this position, the parameters may be stored locally as indicated in FIGS. 2 and 5.

The signature verification module (78) performs the verification procedures already described and returns to the controller a coded signal indicating whether or not the signature presented for verification can be considered valid.

Since this module has the additional capacity to update the stored parameters of the signature, provision is made for signalling a revised set of parameters back to the controller (72) and through it to the host system (73').

It may be arranged, if required by the system user, for any alphanumeric data provided by the character recognition module to be retained by the local controller (72) and only transmitted to the host system (73) on verification of the signature authorizing its transmission. Likewise, the decision whether or not to update the parameters held in the main system data base (74) may be made either at the local controller (72) or at the host system (73).

Instead of the main data base storing signature verification parameters being attached to the host system (73) a distributed memory may be used, each local terminal having its own data base (39) as in FIGS. 2 and 5. This distributed concept may be carried even further to the extent that the parameters relating to a given signature may be coded and recorded on an actual document carried by the owner of the signature, such as for example a credit card, authority card cash card, bank pass book, identity card or passport.

This coding might be provided in Read Only form when the document was first issued, and perhaps changed annually, as with present day credit cards, when a new card is issued, or it might be recorded in a form amenable to updating, as for example using the magnetic stripe provided on most varieties of present day credit cards.

In FIG. 7, the signals which have been described above are passed along the signal paths represented by solid lines. Broken lines are used to indicate the paths for control signals passed between the controller (72) and its peripheral modules. A control line between the communications interface (81) and the controller (72) handles messages to indicate whether an associated data stream relates to reference parameters, a message for display, or a system command.

We claim:

1. Apparatus for comparing a working signature of an individual to verify the working signature, comprising:
   a transducer responsive to the pressure of a pointed writing instrument when the individual writes on a sheet of paper that overlies the transducer, which transducer generates digital electronic signals in real time representing the position of the tip of the writing instrument in terms of X and Y coordinates relative to a predetermined origin of coordinates,
   means arranged to sample at a rapid rate the X and Y coordinates and therefrom to determine the changes from one sample of each coordinate to the next,
   program memory means in which is stored algorithms for identifying significant features of the signature including upper and lower turning points of loops, points at which the writing instrument is applied to and lifted from the paper, and lengths of segments of the signature, and
   digital electronic processor means arranged to operate according to said stored algorithms to:
   a. compute from said changes in X and Y coordinates, from one sample of each coordinate to the next, mathematical parameters representing said significant features of said working and sample signatures,
   b. derive from several specimen signatures for said individual means values and spread indicators of said mathematical parameters and to store said mean values and spread indicators for said individual in data memory means,
   c. respond to a working signature of the individual by calculating the differences between said parameters of said working signature and said mean values of said parameters for said individual retrieved from said data memory means,
   d. calculate for each parameter according to said spread indicator a first difference limit and a second larger difference limit and to calculate a first score for said parameter that corresponds to less than the calculated difference if the difference is less than the first limit, to calculate a second score that corresponds to the calculated difference if the difference is between the first and second limits, and to calculate a third score that is substantially larger than the calculated difference if said calculated difference is greater than the second limit, and
   e. adds the scores for the several parameters and rejects the working signature if the total score exceeds a threshold, said substantially larger third score being such that said threshold will be exceeded if the calculated difference of any parameter exceeds the second limit.

2. Apparatus according to claim 1 further comprising means for varying said score threshold at which a working signature is rejected.

3. Apparatus according to claim 2 wherein said threshold varying means operates in response to the spread of said mathematical parameters derived from the specimen signatures of an individual to vary the score threshold for that individual.

4. Apparatus according to claim 1 wherein said digital electronic processor means is arranged to reject a specimen signature whose calculated parameters deviate substantially from previous specimen signatures of the individual and to repeatedly record specimen signatures until sufficient consistent specimen signatures have been obtained to enable spread indicators to be computed for the parameters.

5. Apparatus according to claim 1 further comprising means for communicating over a communication channel with a host processor whereby recognition parameters for an individual may be transmitted from one location to another location at which the individual's signature is to be verified.

6. Apparatus according to claim 1 further comprising input means for reading the said mean values and spread indicators of an individual recorded on a card to be carried by that individual.

7. Apparatus according to claim 1 wherein said program memory means further stores an algorithm for recognizing alphanumeric characters from said changes in X and Y coordinates and for deriving character codes corresponding to recognized characters.

* * * * *